United States Patent
Kalyanaraman et al.

(10) Patent No.: US 12,398,272 B2
(45) Date of Patent: Aug. 26, 2025

(54) POLYMER-CERAMIC CORE-SHELL PARTICLE POWDERS, AND PROCESSES FOR MAKING AND ARTICLES COMPRISING SUCH POWDERS

(71) Applicant: SHPP Global Technologies B.V., Bergen op Zoom (NL)

(72) Inventors: Viswanathan Kalyanaraman, Newburgh, IN (US); Devendra Narayandas Bajaj, Evansville, IN (US); Thomas Lane Evans, Mt. Vernon, IN (US)

(73) Assignee: SHPP GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 17/754,185

(22) PCT Filed: Sep. 25, 2020

(86) PCT No.: PCT/IB2020/058974
§ 371 (c)(1),
(2) Date: Mar. 25, 2022

(87) PCT Pub. No.: WO2021/059217
PCT Pub. Date: Apr. 1, 2021

(65) Prior Publication Data
US 2022/0289982 A1    Sep. 15, 2022

Related U.S. Application Data

(60) Provisional application No. 62/907,175, filed on Sep. 27, 2019.

(30) Foreign Application Priority Data

Feb. 14, 2020   (EP) ..................... 20157486

(51) Int. Cl.
C09C 1/30  (2006.01)
C09C 1/04  (2006.01)
(Continued)

(52) U.S. Cl.
CPC ............ *C09C 1/3054* (2013.01); *C09C 1/043* (2013.01); *C09C 1/24* (2013.01); *C09D 169/00* (2013.01);
(Continued)

(58) Field of Classification Search
None
See application file for complete search history.

(56) References Cited

U.S. PATENT DOCUMENTS 3,257,357 A   6/1966   Stamatoff
3,257,358 A   6/1966   Stamatoff
(Continued)

FOREIGN PATENT DOCUMENTS

CA   2304361   *   4/1999
CN   1564721       1/2005
(Continued)

OTHER PUBLICATIONS

English translation of Song et al. WO 2015/167069 (Year: 2015).*
(Continued)

*Primary Examiner* — Ronak C Patel
(74) *Attorney, Agent, or Firm* — Norton Rose Fulbright US LLP

(57) ABSTRACT

Ceramic-polymer powders comprising a plurality of core-shell particles, where: each of the core-shell particles comprises a core and a shell around the core; the core comprises a ceramic selected from the group of ceramics consisting of: $Al_2O_3$, $Fe_2O_3$, ZnO, $ZrO_2$, and $SiO_2$; and the shell comprises a polymer selected from the group of polymers consisting of: PC copolymers, polyetherimide (PEI), polyetherimide
(Continued)

(PEI) copolymers, polyphenyl sulfone (PPSU), polyarylethersulfone (PAES), and poly ether sulfones (PES). In powder form, the core-shell particles are in a substantially dry powder form having a moisture content of less than 2% by weight.

4 Claims, 7 Drawing Sheets

(51) Int. Cl.
  *C09C 1/24* (2006.01)
  *C09D 169/00* (2006.01)
  *C09D 179/08* (2006.01)
  *C09D 181/06* (2006.01)
(52) U.S. Cl.
  CPC ......... *C09D 179/08* (2013.01); *C09D 181/06* (2013.01)

(56) References Cited

U.S. PATENT DOCUMENTS

| | | | |
|---|---|---|---|
| 3,306,874 | A | 2/1967 | Hay |
| 3,306,875 | A | 2/1967 | Hay |
| 3,914,266 | A | 10/1975 | Hay |
| 4,028,341 | A | 6/1977 | Hay |
| 4,065,519 | A | 12/1977 | Koch |
| 4,769,424 | A | 9/1988 | Takekoshi et al. |
| 4,806,297 | A | 2/1989 | Brown et al. |
| 4,806,602 | A | 2/1989 | White et al. |
| 4,935,472 | A | 6/1990 | Brown et al. |
| 5,089,566 | A | 2/1992 | Brown et al. |
| 5,110,855 | A | 5/1992 | Blatz |
| 5,739,193 | A | 4/1998 | Walpita et al. |
| 6,518,323 | B1 | 2/2003 | Scheying et al. |
| 7,595,367 | B2 | 9/2009 | Carillo et al. |
| 9,691,520 | B2 | 6/2017 | Kim et al. |
| 2002/0040085 | A1 | 4/2002 | Venigalla |
| 2003/0092557 | A1 | 5/2003 | Aichele et al. |
| 2005/0167136 | A1 | 8/2005 | Centofante |
| 2008/0275162 | A1 | 11/2008 | Schwab et al. |
| 2010/0010141 | A1 | 1/2010 | Nakamura |
| 2011/0104435 | A1 | 5/2011 | Wang |
| 2013/0011660 | A1* | 1/2013 | Diekmann ............ B22F 10/28 428/407 |
| 2013/0171416 | A1* | 7/2013 | Diekmann ............ C08K 9/08 428/407 |
| 2014/0126113 | A1 | 5/2014 | Ogiwara |
| 2014/0126130 | A1 | 5/2014 | Aurongzeb |
| 2015/0073101 | A1 | 3/2015 | Kim et al. |
| 2015/0283791 | A1 | 10/2015 | Yamashita et al. |
| 2016/0255929 | A1 | 9/2016 | Nazzaro et al. |
| 2017/0088471 | A1 | 3/2017 | Randall et al. |
| 2017/0120566 | A1 | 5/2017 | Aldousari et al. |
| 2018/0202076 | A1 | 7/2018 | Van Der Schaaf et al. |
| 2018/0346714 | A1 | 12/2018 | Bushelman et al. |
| 2019/0062219 | A1 | 2/2019 | Ketcham et al. |
| 2019/0168420 | A1 | 6/2019 | Reese et al. |
| 2019/0185382 | A1 | 6/2019 | Bolvari et al. |
| 2019/0352804 | A1 | 11/2019 | Kopping et al. |
| 2022/0289638 | A1 | 9/2022 | Kalyanaraman et al. |
| 2022/0289982 | A1 | 9/2022 | Kalyanaraman et al. |

FOREIGN PATENT DOCUMENTS

| | | |
|---|---|---|
| CN | 101054300 | 10/2007 |
| CN | 101328024 | 12/2008 |
| CN | 102325645 | 1/2012 |
| CN | 102548933 | 7/2012 |
| CN | 102863224 | 1/2013 |
| CN | 102275983 | 4/2013 |
| CN | 202956507 | 5/2013 |
| CN | 202977722 | 6/2013 |
| CN | 103755848 | 4/2014 |
| CN | 103764393 | 7/2014 |
| CN | 104057091 | 9/2014 |
| CN | 104057092 | 9/2014 |
| CN | 105381765 | 3/2016 |
| CN | 105482010 | 4/2016 |
| CN | 105940044 A | 9/2016 |
| CN | 106749790 | 5/2017 |
| CN | 107266082 | 10/2017 |
| CN | 107286596 | 10/2017 |
| CN | 107673658 | 2/2018 |
| CN | 108407164 | 8/2018 |
| CN | 109890876 | 6/2019 |
| CN | 105940044 B | 7/2019 |
| CN | 110140244 | 8/2019 |
| CN | 110268006 | 9/2019 |
| EP | 868732 | 10/1998 |
| EP | 2157121 | 2/2010 |
| EP | 3555350 | 10/2019 |
| JP | H01125338 | 5/1989 |
| JP | H 03236930 A | 10/1991 |
| JP | H 03236931 A | 10/1991 |
| JP | 11345518 | 12/1999 |
| JP | 2010/028179 | 2/2010 |
| KR | 20100098248 | 9/2010 |
| KR | 101796281 | 11/2017 |
| KR | 20180127148 A | 11/2018 |
| WO | WO 1997/042639 | 11/1997 |
| WO | WO 2014/015674 | 1/2014 |
| WO | WO 2015/167069 | 11/2015 |
| WO | WO 2017/012119 | 1/2017 |
| WO | WO 2017/039634 | 3/2017 |
| WO | WO 2017/088471 | 6/2017 |
| WO | WO 2017/149086 | 9/2017 |
| WO | WO 2018/039619 | 3/2018 |
| WO | WO 2018/039620 | 3/2018 |
| WO | WO 2018/039628 | 3/2018 |
| WO | WO 2018/039634 | 3/2018 |
| WO | WO 2018/112390 | 6/2018 |
| WO | WO 2018/140451 | 8/2018 |
| WO | WO 2018/192170 | 10/2018 |
| WO | WO 2019/025472 | 2/2019 |
| WO | WO 2019/027420 | 2/2019 |
| WO | WO 2019/183192 | 9/2019 |
| WO | WO 2019/193578 | 10/2019 |
| WO | WO 2021/059218 | 5/2021 |

OTHER PUBLICATIONS

ARBURG GmbH + Co KG, "Powder injection moulding: Cost-effective solutions for metal or ceramic parts", 2016, 12 pages.

Benhadjala W. et al., "Effect of processing factors on dielectric properties of BaTiO3/hyperbranched polyester core-shell nanoparticles," 2013 IEEE 63rd Electronic Components and Technology Conference, 2013, pp. 1767-1772, doi: 10.1109/ECTC.2013.6575814.

Brandt, K. et al. "Novel ceramic-polymer composites synthesized by compaction of polymer-encapsulated TiO2-nanoparticles", Composites Science and Technology, 72, pp. 65-71, 2011.

Chiang, C. et al., "Polymer Composites with High Dielectric Constant", Ferroelectrics, vol. 275, pp. 1-9, Dec. 24, 2001.

Edwards, J. "Apple Watch and the story of ceramics", iMore, Apr. 14, 2017. https://www.imore.com/new-star-constellation-ceramic-watches.

European Search Report and Written Opinion for Application No. 20157480.3, dated Oct. 21, 2020.

European Search Report and Written Opinion for Application No. 20168054.3, dated Sep. 24, 2020.

European Search Report and Written Opinion for Application No. 20157486.0, dated Dec. 10, 2020.

European Search Report and Written Opinion for Application No. 20157482.9, dated Sep. 28, 2020.

European Search Report and Written Opinion for Application No. 20180089.3, dated Nov. 26, 2020.

European Search Report and Written Opinion for Application No. 22154749.0, dated Jul. 22, 2022.

(56) References Cited

OTHER PUBLICATIONS

Guo, H. et al., Cold sintering process for 8 mol%Y2O3-stabilized ZrO2 ceramics, Journal of the European Ceramic Society, 37(5), 2303-2308, 2017.
Handge et al., "Viscoelastic and dielectric properties of composites of poly(vinyl butyral) and alumina particles with a high filling degree," Polymer 82 (2016) 337-348.
He, G. et al., "Research Progress on Polymer-based Dielectric Composites", Materials Review, 23, 2011, pp. 85-91.
Hutchinson, J.W. et al., "Mechanisms of toughening in ceramics", Theoretical and Applied Mechanics, 139-144, 1989.
International Search Report and Written Opinion for PCT/IB2020/059515 mailed Jan. 20, 2021.
International Search Report and Written Opinion for PCT/IB2020/058974 mailed Feb. 9, 2021.
International Search Report and Written Opinion for PCT/IB2020/058975 mailed Apr. 30, 2021.
International Search Report and Written Opinion in Corresponding PCT Application No. PCT/IB2021/052756, mailed Jun. 14, 2021.
International Search Report and Written Opinion for PCT/IB2023/050920 mailed Apr. 3, 2023.
Liu, J. et al., "Learn Iron and Forestry Engineering", *Engineering Materials, University of Technology Press*, pp. 280-282, Nov. 2016.
Luo, Y. et al., "PTC Characteristics and Microstructures of a Polymer Based Conductive Composite Filled with Various Titanium Compounds" China Plastics, 5, 2004.
Parhizkar, M. et al. "Correlation between sintering pressure and electrical properties of hot-press sintered gallium arsenide-polyaniline-polyethylene composite varistors", Materials Science in Semiconductor Processing, 17 pp. 143-148, 2014.
Peng, H. et al., The dimensional effect of MgTiO3 ceramic filler on the microwave dielectric properties of PTFE/MgTiO3 composite with ultra-low dielectric loss. J Mater Sci: Mater Electron 30, 6680-6687 (2019). htttps://doi.org/10.1007/s10854-019-00977-y.
Stinson, L., "Here's What You Need to Know About Ceramic, The Fancy Material in Apple's Fanciest Watch", WIRED, Sep. 8, 2016. https://www.wired.com/2016/09/apples-new-high-end-watch-crazy-tough-ceramics-baby/.
Stunda-Zujeva, A. et al. "Controlling the morphology of ceramic and composite powders obtained via spray drying—A review", Ceramics International, 43 pp. 11543-11551, 2017.
Tai, J. et al., "Synthesis of Ceramic Precursor Polyvinylsilazane-b-Polystyrene and Preparation of Ceramic Nanoparticles", Journal of Synthetic Crystals, 5, 2011. pp. 1266-1270.
Wolff, M. et al. "Novel, highly-filled ceramic-polymer composites synthesized by a spouted bed spray granulation process", Composites Science and Technology, 90, pp. 154-159, 2014.

* cited by examiner

POLYMER-CERAMIC CORE-SHELL PARTICLE POWDERS, AND PROCESSES FOR MAKING AND ARTICLES COMPRISING SUCH POWDERS

CROSS-REFERENCE TO RELATED APPLICATIONS

This application is a national phase application under 35 U.S.C. § 371 of International Application No. PCT/IB2020/058974 filed Sep. 25, 2020, which claims the benefit of priority of European Patent Application No. 20157486.0 filed Feb. 14, 2020, which claims the benefit of priority of U.S. Provisional Patent Application No. 62/907,175 filed 27 Sep. 2019, all of which are hereby incorporated by reference in their entirety.

FIELD OF INVENTION

This disclosures relates generally to ceramic-thermoplastic composites and more particularly, but not by way of limitation, to polymer-ceramic core-shell particle powders in which the polymer exhibits induced crystallinity, and related processes and articles.

BACKGROUND

There are currently a limited number of ceramic-polymer composites with a high proportion of ceramic. Known ceramic-polymer composites typically contain significantly less than 50% by volume of ceramic, and significantly more than 50% by volume of polymer.

A first category of such ceramic-polymer composites relies on a thermoset approach in which a monomer is combined with the porous ceramic structure and cured to form a composite. But this approach generally requires undesirably-long curing times, and density of a final part is generally dependent on the size of pores in the ceramic and the viscosity of the resin.

A second category of such ceramic-polymer composites relies on thermoplastic polymers, which generally do not require time to cure and can instead be simply heated to melt and subsequently cooled to solidity the thermoplastic polymer, thereby enabling relatively faster processing. Ceramic fillers have been compounded with thermoplastics to achieve certain properties, including stiffness and strength. However, the ceramic filler content in such thermoplastic polymers is typically limited to significantly less than 50% by volume due to limitations of conventional compounding technology. For example, in a traditional approach of this type, a ceramic filler is added to a polymer and the mixture is compounded in an extruder and palletized. Generally, the dispersion and distribution of the ceramic filler in the polymer matrix is highly dependent on the type of ceramic and polymer, other additives and coupling agents, rate of mixing, shear rate, temperature, and various other parameters. Due at least to these limitations, higher proportions of ceramics fillers e.g., greater than 50% by volume) in a polymer matrix is challenging, and may for example damage the screws in an extruder (depending on the hardness of the ceramic) and degrade the polymer because of shear and heat.

A third category of such ceramic-polymer composites relies on the more-recently identified approach known as "cold sintering," various aspects of which may be described in U.S. Patent App. Pub. No. US 2017/0088471 and PCT Application Pub. Nos. (1) WO 2018/039620, (2) No. WO 2018/039628, (3) WO 2018/039619, and (4) WO 2018/039634. One drawback with cold sintering, however, is that not all ceramics can be effectively cold sintered. For example, certain structural ceramics like Aluminum Oxide, Zirconia, Titanium Oxide, and Silicon Carbide generally cannot be cold sintered. Additionally, the structures produced by cold sintering typically utilize ceramic as the matrix and polymer as the filler, which generally results in differing structural properties and differing suitability for various end-use applications.

A fourth category of such ceramic-polymer composites can involve dissolving an amorphous polymer in a solvent, and mixing ceramic particles into the polymer-solvent mixture. For example, a sprouted-bed granulation process can be used to create polymer-coated ceramic powders, such as described in Wolff, Composites Science and Technology 90 (2014) 154-159.

SUMMARY

This disclosure includes polymer-ceramic core-shell particles in which the polymer shell exhibits induced crystallinity, powders and pellets of such core-shell particles, methods of making such core-shell particles in powder and pellet forms, and methods of molding a part from a powder of such core-shell particles. Such core-shell particles comprise a core and a shell around the core, in which the shell comprises a polymer exhibiting induced crystallinity, and the core comprises a ceramic. The polymer is generally amorphous but exhibits induced crystallinity when formed into a shell of the present core-shell particles, and is selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES). The induced crystallinity of the polymer shell is recognizable and characterized in that the polymer of the shell exhibits both a glass transition temperature (Tg) and a melt temperature (Tm), for example as determined via differential scanning calorimetry (DSC) described below. The ceramic is selected from the group of ceramics consisting of: Alumina ($Al_2O_3$), Ferric Oxide ($Fe_2O_3$), Iron (II, III) Oxide ($Fe_3O_4$), Zinc Oxide (ZnO), Zirconia ($ZrO_2$), and Silica ($SiO_2$). Such core-shell particles, and powders and pellets thereof, permit the molding of ceramic-composite molded parts with high ceramic content by conventional processes such as compression molding and injection molding.

The present methods of making polymer-ceramic core-shell particles permit the formation of such core-shell particles with relatively uniform coatings of the polymer shell material. More particularly, in the present core-shell particles (formed by the present methods), the shell can surround substantially all of the surface of the core, at least in configurations in which the polymer comprises at least 10% by volume of the core-shell particles. Likewise, the present core-shell particles (formed by the present methods) facilitate the molding of ceramic-polymer composite parts with significantly less agglomeration of ceramic particles than prior compounding methods in which parts are molded from a mixture of separate ceramic particles and polymer particles. By way of example, and not to be limited by a particular theory, it is currently believed that the substantially uniform polymer coating formed on the ceramic core causes the polymer to resist separation from the ceramic during processing and molding, and thereby resist contact between (and agglomeration of) the ceramic cores. Further, the present methods of making polymer-ceramic core-shell particles permit the formation of relatively fine, relatively consistent powders without the need for grinding or sieving. The present methods can also result in core-shell particles with less variation in size relative to the starting polymer powder which, in turn, leads to more uniform distribution of ceramic and polymer in molded part than has been possible with traditional compounding methods in which parts are molded from a mixture of separate ceramic particles and polymer particles. For example, as described in more detail below in Table 1B, the Dv90 of the PPS-$Al_2O_3$ was about 32% of the Dv90 of the raw PPS powder used in the described examples.

Ultimately, the present methods permit the formation of powders of polymer-ceramic core-shell particles with relatively large fractions of ceramic (e.g., greater than 50% by volume, between 50% and 90% by volume, between 50% and 70% by volume, and/or the like). By way of further example, for ceramic:polymer ratios between 55:45 and 65:45 by volume, the ceramic particles can have a surface area of from 2 to 4 $m^2/g$ (e.g., from 2 to 2.5 $m^2/g$, 2 to 3 $m^2/g$, 2 to 3.5 $m^2/g$, 2.5 to 3 $m^2/g$, 2.5 to 3.5 $m^2/g$, 2.5 to 4 $m^2/g$, 3 to 3.5 $m^2/g$, 3 to 4 $m^2/g$, or 3.5 to 4 $m^2/g$); for ceramic:polymer ratios between 50:50 and 60:40 by volume, the ceramic particles can have a surface area of from 3 to 6 $m^2/g$ (e.g., from 3 to 3.5 $m^2/g$, 3 to 4 $m^2/g$, 3 to 4.5 $m^2/g$, 3 to 4 $m^2/g$, 3 to 5 $m^2/g$, 3 to 4 $m^2/g$, 3 to 5.5 $m^2/g$, 3.5 to 4 $m^2/g$, 3.5 to 4.5 $m^2/g$, 3.5 to 5 $m^2/g$, 3.5 to 5.5 $m^2/g$, 4 to 4.5 $m^2/g$, 4 to 5 $m^2/g$, 4 to 5.5 $m^2/g$, 4.5 to 5 $m^2/g$, 4.5 to 5.5 $m^2/g$, or 5 to 5.5 $m^2/g$); for ceramic:polymer ratios between 60:40 and 70:30 by volume, the ceramic particles can have a surface area of from 1 to 3 $m^2/g$ (e.g., from 1 to 1.5 $m^2/g$, 1 to 2 $m^2/g$, 1 to 2.5 $m^2/g$, 1.5 to 2 $m^2/g$, 1.5 to 2.5 $m^2/g$, 1.5 to 3 $m^2/g$, 2 to 2.5 $m^2/g$, 2 to 3 $m^2/g$, or 2.5 to 3 $m^2/g$); and for ceramic:polymer ratios between 70:30 and 90:10 by volume, the ceramic particles can have a surface area of from 0.5 to 2 $m^2/g$ (e.g., from 0.5 to 1 $m^2/g$, 0.5 to 1.5 $m^2/g$, 0.5 to 2 $m^2/g$, 1 to 1.5 $m^2/g$, 1 to 2 $m^2/g$, or 1.5 to 2 $m^2/g$).

By way of example, such polymer-ceramic core-shell particles with higher proportions of structural ceramic (i.e., $Al_2O_3$, ZnO, $Fe_2O_3$, $Fe_3O_4$, $ZrO_2$, or $SiO_2$) can be beneficial in structural components like gears, CE housings, protective shields, and the like because these types of applications typically benefit from properties such as wear resistance, hardness, scratch resistance, toughness, and stiffness. Additionally, the inclusion of ceramic particles in a polymer matrix can permit the adjustment and/or selection of properties like dielectric constant, dissipation factor, and RF transparency that can be beneficial for certain electronics applications.

Certain configurations of the present ceramic-polymer composite powders comprise: a plurality of core-shell particles, where: each of the core-shell particles comprises a core and a shell around the core; the core comprises a particle of a ceramic selected from the group of ceramics consisting of: $Al_2O_3$, $Fe_3O_4$, $Fe_2O_3$, ZnO, $ZrO_2$, $SiO_2$, and combinations of any two or more of these ceramics; the shell comprises a polymer selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES); where the core-shell particles are in powder form. The core-shell particles can comprise between 50% and 90% by volume of the ceramic, and between 10% and 50% by volume of the polymer; and/or can have a Dv50 of from 100 nanometers (nm) to 100 micrometers (μm). Typically, substantially all of the polymer is not cross-linked.

Certain configurations of the present dense polymer-ceramic composite articles comprise: a polymer matrix and ceramic filler disposed in the polymer matrix; where the ceramic filler comprises particles of a ceramic selected from the group of ceramics consisting of: $Al_2O_3$, $Fe_3O_4$, $Fe_2O_3$, ZnO, $ZrO_2$, $SiO_2$, and combinations of any two or more of these ceramics; where the polymer matrix comprises a polymer selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES); and where the Relative Density of the article is greater than 90%. The ceramic filler can comprise between 50% and 90% by volume of the article, and the polymer matrix can comprise between 10% and 50% by volume of the article. Typically, the ceramic particles are substantially free of agglomeration.

The present ceramic-polymer composite materials can also be pelletized (converted to pellet form). Such pelletized material can comprise: a plurality of solid pellets each comprising a plurality of core-shell particles, where: each of the core-shell particles comprises a core and a shell around the core; the core comprises a particle of a ceramic selected from the group of ceramics consisting of: $Al_2O_3$, $Fe_3O_4$, $Fe_2O_3$, ZnO, $ZrO_2$, $SiO_2$, and combinations of any two or more of these ceramics; the shell comprises a polymer selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES); and the shells of adjacent core-shell particles are joined to resist separation of the adjacent core-shell particles and deformation of a respective pellet. In such pellets, the core-shell particles can comprise between 50% and 90% by volume of the ceramic, and between 10% and 50% by volume of the polymer. Typically, substantially all of the polymer is not cross-linked.

In certain implementations of the present methods of forming a ceramic-polymer composite powder, the method comprises: mixing a polymer, solvent, and particles of a ceramic; dissolving at least partially the polymer in the solvent by superheating the mixture to a first temperature above the normal boiling point of the solvent and while maintaining the mixture at a first pressure at which the solvent remains substantially liquid; agitating the superheated mixture for a period of minutes while maintaining the mixture at or above the first temperature and at or above the first pressure; and cooling the mixture to or below a second temperature below the normal boiling point of the solvent to cause the polymer to precipitate on the particles of the ceramic and thereby form a plurality of core-shell particles each comprising a core and a shell around the core, where the core comprises a particle of the ceramic and the shell comprises the polymer. In such methods, the polymer is selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES); and the ceramic is selected from the group of ceramics consisting of: $Al_2O_3$, $Fe_3O_4$, $Fe_2O_3$, ZnO, $ZrO_2$, $SiO_2$, and combinations of any two or more of these ceramics.

In certain implementations of the present methods of molding a part from the present core-shell particles, the method comprises: subjecting a powder of one of the present polymer-ceramic core-shell particles to a first pressure while the powder is at or above a first temperature that exceeds a melting temperature of the polymer; where the powder substantially fills a working portion of a cavity of a mold.

The terms "a" and "an" are defined as one or more unless this disclosure explicitly requires otherwise. The terms "substantially" and "about" are each defined as largely but not necessarily wholly what is specified (and includes what is specified; e.g., substantially 90 degrees includes 90 degrees), as understood by a person of ordinary skill in the art. In any disclosed embodiment, the term "substantially" or "about" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. The phrase "at least one of A and B" has the same meaning as "A, B, or A and B."

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

As used herein, a "size" or "diameter" of a particle refers to its equivalent diameter—referred to herein as its diameter—if the particle is modelled as a sphere. A sphere that models a particle can be, for example, a sphere that would have or produce a value measured for the particle, such as the particle's mass and/or volume, light scattered by the particle, or the like. Particles of the present dispersions can, but need not, be spherical.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
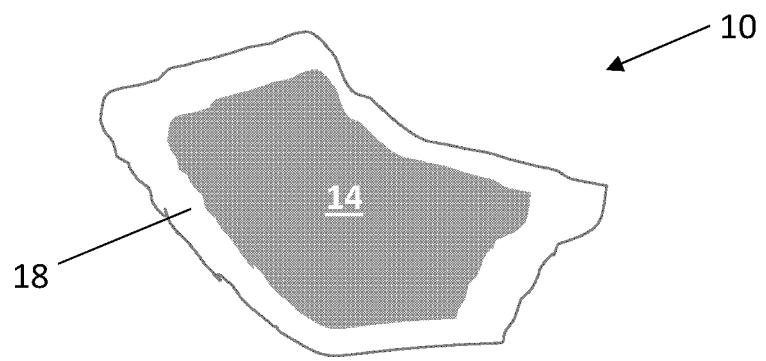
FIG. 1 is a schematic illustration of one of the present core-shell particles comprising a polymer shell and a core of polymer.

Referring now to the drawings, and more particularly to FIG. 1, a schematic illustration is shown of one of the present core-shell particles 10 comprising a core 14 and a shell 18 around the core. In the illustrated configurations, for example, core 14 comprises a single particle of Alumina ($Al_2O_3$), Ferric Oxide ($Fe_2O_3$), Iron (II, III) Oxide ($Fe_3O_4$), Zinc Oxide (ZnO), Zirconia ($ZrO_2$), or Silica ($SiO_2$), and may have a spherical, elongated (e.g., cylindrical), irregular, or otherwise fanciful shape as shown. In other configurations, the core may comprise an agglomeration of two or more particles, and/or may have a substantially spherical shape. Shell 18 comprises a polymer selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES). In the illustrated configuration, shell 18 covers or surrounds substantially all of core 14. In other configurations, the shell need not cover or surround all of the core (e.g., may cover a majority of the core). As described in more detail below, the present methods permit the formation of a polymer shell (e.g., 18) that is not cross-linked and, for certain polymers, that exhibits induced crystallinity.

In the present core-shell particles, the core (e.g., 14) can have a particle size (e.g., diameter or minimum transverse dimension) of from 100 nanometers (nm) to 100 micrometers (μm). For example, the cores in a ceramic powder used to form core-shell particles in the present methods can have a Dv90 or Dv50 of between 100 nm and 100 μm (e.g., from 100 nm to 500 nm, from 100 nm to 400 nm, from 1 μm to 100 μm, from 1 μm to 50 μm, from 2 μm to 50 μm, from 3 μm to 20 μm, from 2 μm to 10 μm, from 3 μm to 10 μm, from 4 μm to 10 μm).

The present powders comprise a plurality of particles 10, for example in a powder form. For example, a powder may be characterized by a polymer-solvent content (a solvent in which the polymer is dissolvable) of less than 3,000 parts per million (ppm) (e.g., less than 2,000 ppm, less than 1,000 ppm). However, in some configurations, the powder may be mixed with and/or suspended in a liquid that is not a polymer-solvent (a liquid in which the polymer will not dissolve), such as water. In such configurations, the liquid may resist and/or prevent particles from becoming airborne or breathable, such as for transportation and handling of finer powders.

In some configurations of such powders, the core-shell particles comprise between 50% and 90% by volume of the ceramic (e.g., 50% and 70% by volume of the ceramic).

Figure 2:
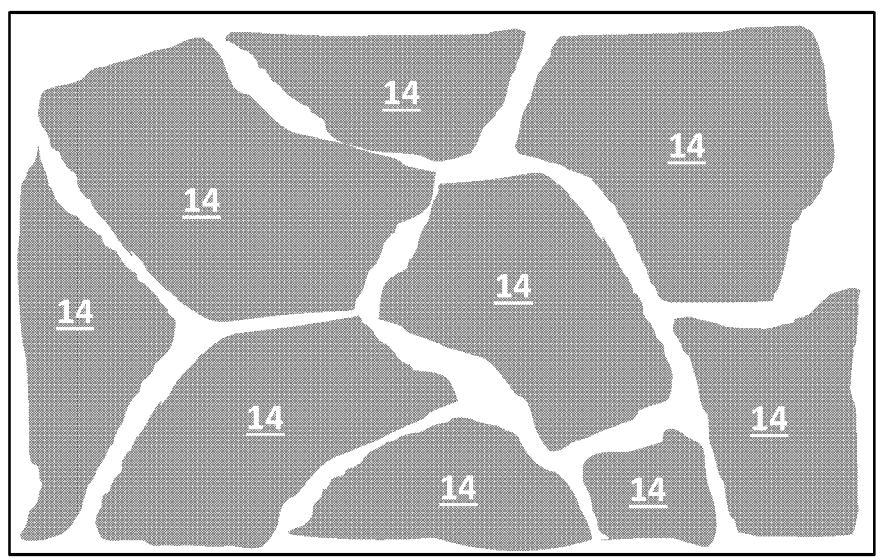
FIG. 2 is a schematic illustration of the internal structure of a part molded from a dry powder of the present core-shell particles.

FIG. 2 is a schematic illustration of the internal structure of a part molded from a dry powder of the present core-shell particles 10. As shown, the polymer shells 18 of adjacent particles merge together to fill interstices between and bond the particles together. As shown, the relatively higher proportion (e.g., 50% to 90% by volume) of ceramic in the powder means that a correspondingly higher proportion of the molded part is also ceramic. Further, the core-shell structure of the particles prior to molding results in more-uniform distribution of polymer within the matrix of the molded part. By way of example, the present core-shell particles, in which the ceramic particles are substantially free of agglomeration and/or substantially all of the ceramic particles are each substantially surrounded by polymer, enable the molding of parts that are also substantially free of agglomeration and/or in which substantially all of the ceramic particles is separated by a layer of polymer from adjacent ceramic polymer particles.

The present powders can also be pelletized or joined into a pellet form in which the shells of adjacent core-shell particles are joined to resist separation of the adjacent core-shell particles and deformation of a respective pellet. For example, the present powders may be subjected to elevated temperatures and pressures in an extruder. Such temperatures may be at or near the glass transition temperature ($T_g$) or the melting temperature ($T_m$) of the polymer in the core-shell particles to render the polymer tacky but not liquefied, and such pressures (e.g., during extrusion) may be elevated relative to ambient, such that shells of adjacent core-shell particles join sufficiently to resist separation but no so much that the independent boundaries/identities of adjacent shells are lost. In such configurations, the pellet form may facilitate transportation of the core-shell particles (e.g., for distribution). Such pelletization can be achieved by any of various methods and processes that are known in the art, such as, for example, via a screw extruder.

Polycarbonate (PC) Copolymers

Polycarbonate (PC) refers generally to a group of thermoplastic polymers containing carbonate groups. PCs used in engineering are strong, tough materials, and some grades are optically transparent. PCs are typically easily worked, molded, and thermoformed, and therefore are used in various applications. The present configurations and implementations utilize a polycarbonate copolymer or interpolymer rather than a homopolymer. Polycarbonate copolymers can include copolycarbonates comprising two or more different types of carbonate units, for example units derived from BPA and PPPBP (commercially available under the trade name XHT or CXT from SABIC); BPA and DMBPC (commercially available under the trade name DMX from SABIC); or BPA and isophorone bisphenol (commercially available under the trade name APEC from Bayer). The polycarbonate copolymers can further comprise non-carbonate repeating units, for example repeating ester units (polyester-carbonates), such as those comprising resorcinol isophthalate and terephthalate units and bisphenol A carbonate units, such as those commercially available under the trade name LEXAN SLX from SABIC; bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units; or bisphenol A carbonate units and $C_{6-12}$ dicarboxy ester units such as sebacic ester units (commercially available under the trade name HFD from SABIC). Other polycarbonate copolymers can comprise repeating siloxane units (polycarbonate-siloxanes), for example those comprising bisphenol A carbonate units and siloxane units (e.g., blocks containing 5 to 200 dimethylsiloxane units), such as those commercially available under the trade name EXL from SABIC; or both ester units and siloxane units (polycarbonate-ester-siloxanes), for example those comprising bisphenol A carbonate units, isophthalate-terephthalate-bisphenol A ester units, and siloxane units (e.g., blocks containing 5 to 200 dimethylsiloxane units), such as those commercially available under the trade name FST from SABIC. Combinations of any of the above materials can be used.

Polyetherimide (PEI) and Polyetherimide (PEI) Copolymers

Polyetherimide (PEI) is an amorphous, amber-to-transparent thermoplastic with characteristics similar in some respects to polyether ether ketone (PEEK). Relative to PEEK, PEI may be lower in impact strength and usable temperature. Examples of PEI are available from SABIC Innovative Plastics under the trade names ULTEM, SILEM, and EXTEM.

The polyetherimide can be selected from polyetherimide homopolymers, e.g., polyetherimides, polyetherimide copolymers, e.g., polyetherimide sulfones, and combinations thereof. Polyetherimides include, but are not limited to, known polymers, such as those sold by SABIC Innovative Plastics under the Ultem*, Extern*, and Siltem* brands (Trademark of SABIC Innovative Plastics IP B.V.).

Polyarylethersulfone (PAES)

Polyarylethersulfones or poly(aryl ether sulfone)s (PAES) are typically linear, amorphous, injection moldable polymers possessing a number of desirable features such as excellent high temperature resistance, good electrical properties, and toughness. Due to their excellent properties, the poly(aryl ether sulfone)s can be used to manufacture a variety of useful articles such as molded articles, films, sheets, and fibers.

Polyphenylsulfone (PPSU)

Polyphenylsulfone (PPSU) is an amorphous, heat-resistant and transparent high-performance thermoplastic. PPSU is generally known in the art as having high toughness and flexural and tensile strength, excellent hydrolytic stability, and resistance to chemicals and heat.

The below-described PPSU examples utilized amorphous polyphenylsulfone, CAS Reg. No. 25608-64-4, having a weight average molecular weight of 50,100 grams/mole and a number average molecular weight of 18,500 grams/mole (determined by gel permeation chromatography using a polystyrene standard); having a hydroxyl group content less than 10 parts per million by weight; and obtained in pellet form as RADEL® R5100-5 polyphenylsulfone. RADEL is a trademark of Solvay, Inc.

Polyether Sulfone (PES)

Polyethersulfones (PES) are typically linear, amorphous, injection moldable polymers possessing a number of desirable features such as excellent high temperature resistance, good electrical properties and toughness. Due to their excellent properties, the polyethersulfones can be used to manufacture a variety of useful articles such as molded articles, films, sheets and fibers. PES offers high chemical and solvent resistance and is particularly useful for manufacturing articles that are exposed to solvents or chemical agents at elevated temperatures and for extended times. Thus, PES finds application in articles such as medical trays, which are subjected to repeated and rigorous sterilization procedures.

Methods of Making Powders of Polymer-Ceramic Core-Shell Particles

Figure 3:
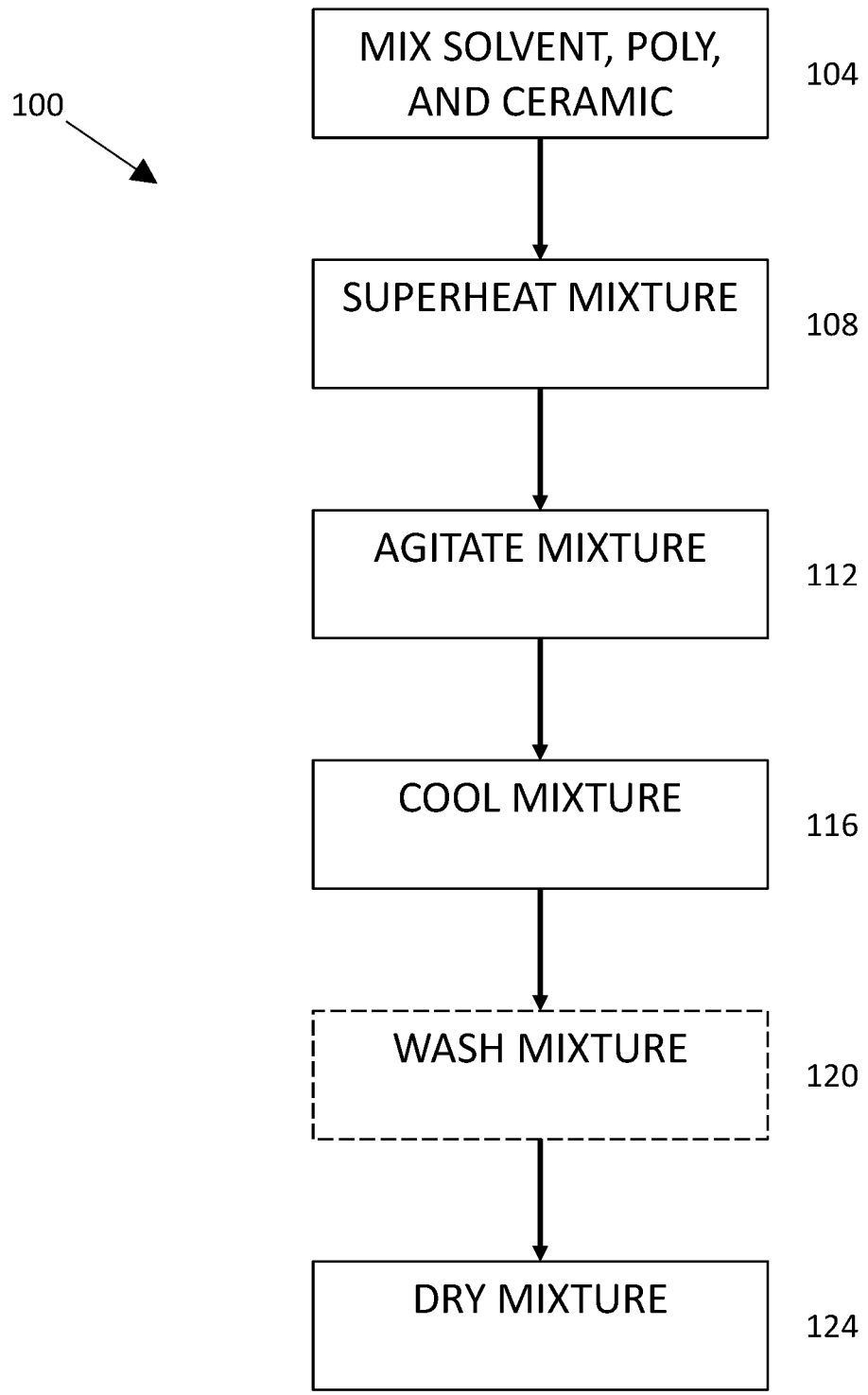
FIG. 3 is a flowchart of one example of a method of making a powder of the present core-shell particles.
Figure 4:
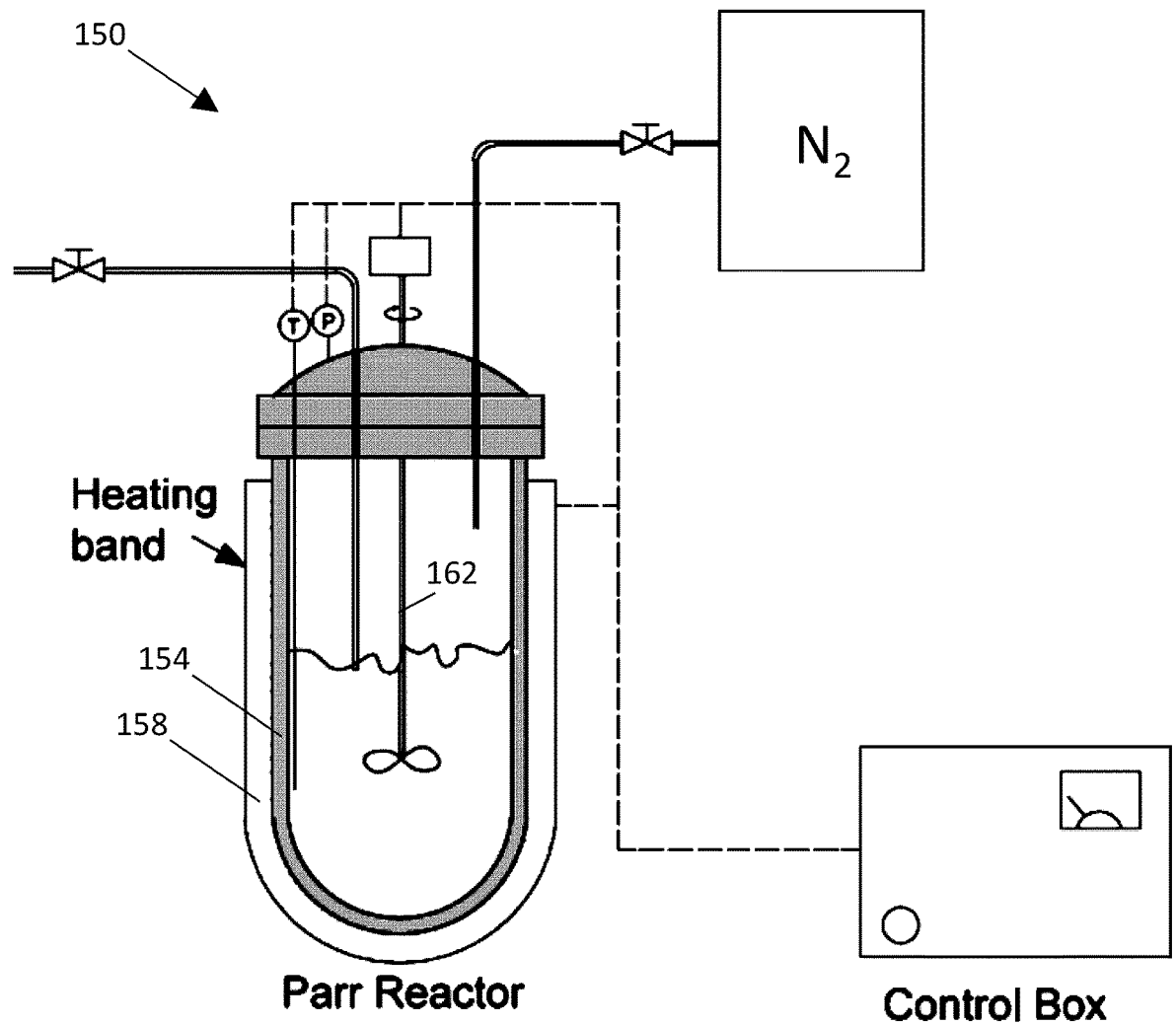
FIG. 4 is a schematic illustration of stirring reactor of a type that can be used to make a powder of the present core-shell particles.

Referring now to FIGS. 3 and 4, FIG. 3 depicts a flowchart 100 of one example of a method of making a powder of the present core-shell particles (e.g. 10), and FIG. 4 depicts a schematic illustration of stirring reactor 150 of a type (e.g., a PARR™ reactor) that can be used to make a powder of the present core-shell particles.

First mixing the ceramic particles with the solvent can have certain benefits, for example, in reducing the agglomerating of ceramic particles. This benefit can be realized whether beginning with ceramic particles that are not agglomerated in their powder form, or with ceramic particles that are agglomerated in their powder form. For example, the $Al_2O_3$ powder (CAS 1344-28-1) used in the below-described examples was obtained from Alfa Aesar and, in its raw form prior to usage in the present methods, comprised spherical hollow particles with an average particle size of from 20 to 50 μm and surface area of from 5 to 6 $m^2/g$. Mixing these hollow particles with solvent prior to adding polymer caused the hollow particles to break down into their smaller, solid particles components, which solid particles had an average particle size of 1 μm or smaller, while also resisting re-agglomeration of the solid particles during the subsequent mixing, dissolution, and precipitation of the polymer on the solid ceramic particles.

At a step 104, polymer, solvent, and particles of ceramic are mixed together. The polymer, solvent, and ceramic may be mixed at the same time in a single vessel, or may be mixed sequentially. For example, the ceramic particles may first be mixed into a solvent (e.g., in a first vessel, such as a homogenizer), and the polymer may subsequently be mixed into the solvent-ceramic mixture (e.g., in the first vessel or in a second vessel, such as a shell or container 154 of stirring reactor 150). The solvent may comprise any solvent in which the polymer will dissolve under superheated conditions, as described below. Examples of solvents that may be utilized with certain of the present polymers include Methyl Ethyl Ketone (MEK), N-Methyl-2-pyrrolidone (NMP), orthodichlorobenzene (ODCB), diclomethane, and Xylene. By way of example, ODCB may be used with PEI and certain PEI copolymers, ODCB may be used with PPSU, diclomethane may be used with PES, and Xylene may be used with certain PC copolymers. Other solvents that may be utilized in the present methods include those in which a selected polymer is Freely Soluble or Soluble at elevated temperatures (e.g., above 75° C., above 100° C., about 150° C., and/or above 200° C.), and Slightly Soluble or Sparingly Soluble at lower temperatures (e.g., below 50° C., such as at ambient temperatures). As used herein, Freely Soluble requires 1 to 10 ml of solvent to dissolve 1 gram (g) of the polymer, Soluble requires 10 to 30 ml of solvent to dissolve 1 gram (g) of the polymer; Slightly Soluble requires 100 to 1000 ml of solvent to dissolve 1 gram (g) of the polymer; Sparingly Soluble requires 1000 to 10000 ml of solvent to dissolve 1 gram (g) of the polymer.

At a step 108, the mixture of polymer, ceramic, and solvent is superheated (e.g., via a heating element 158 of reactor 150) to at least partially (e.g., fully) dissolve the polymer in the solvent. In particular, the mixture is heated to a first temperature that exceeds the normal boiling point of the solvent (and exceeds the glass transition temperature of an amorphous polymer), under a first pressure at which the solvent remains liquid. For example, when using ODCB as the solvent, the mixture can be heated to 250° C. under a pressure of up to 180 pounds per square inch (psi) (e.g., 75 psi). By way of additional sample, when using Xylene as the solvent, the mixture can be heated to 200° C. under a pressure of up to 180 pounds per square inch (psi) (e.g., 75 psi). When using other solvents, the pressure may be kept at a different level (e.g., 100 psi).

At a step 112, which may be partially or entirely simultaneous with step 108, the mixture is agitated (e.g., via impeller 162 of reactor 150) for a period of minutes (e.g., equal to or greater than 1 minute, 5 minutes, 10 minutes, 20 minutes, 30 minutes, 40 minutes, 50 minutes, 60 minutes, or more) while the temperature of the mixture is substantially maintained at or above the first temperature, and the pressure to which the mixture is subjected is substantially maintained at or above the first pressure. In particular, the temperature and pressure are maintained during agitation to keep the mixture in a superheated state.

At a step 116, the mixture is cooled to or below a second temperature that is below the normal boiling point of the solvent to cause the polymer to precipitate on the particles of the ceramic and thereby form a plurality of the present core-shell particles (e.g., 10). For example, when using ODCB as the solvent, the mixture may be cooled to less than 120° C., less than 110° C., and/or to 100° C. By way of further example, when using Xylene as the solvent, the mixture may be cooled to less than 70° C., less than 60° C., and/or to 50° C. Optionally, the mixture may continue to be agitated during this cooling step to resist agglomeration of the core-shell particles.

At an optional step 120, the formed core-shell particles may be washed or rinsed, either with the same solvent added in step 104 (e.g., ODCB or Xylene) or with a different solvent (e.g, Methanol or MeOH). For example, the wet solids cake can be removed from the vessel (e.g., shell or container 154 of reactor 150) and placed in a filter for rinsing.

At a step 124, the solids cake is dried to form a dry powder of the core-shell particles (e.g., 10), for example, at a temperature above the normal boiling point of the solvent added in step 104 and/or of the solvent used to wash/rinse the solids cake at optional step 120, optionally at a second pressure below ambient pressure (i.e., under vacuum). For example, when ODCB (normal boiling point of ~180° C.) is added at step 104 and MeOH (normal boiling point of ~65° C.) is used in step 120, the solids cake can be dried under vacuum at a temperature of 200° C. for a period of time (e.g., 4 hours, 6, hours, 8 hours, 10 hours, 12 hours, or more). By way of further example, when Xylene (normal boiling point of ~144° C.) is added at step 104 and MeOH (normal boiling point of ~65° C.) is used in step 120, the solids cake can be dried under vacuum at a temperature of 150° C. for a period of time (e.g., 4 hours, 6, hours, 8 hours, 10 hours, 12 hours, or more).

Prior to mixing the polymer with the solvent and ceramic at step 104, the polymer is amorphous. However, after the cooling at step 116 and/or after drying at step 124, the polymer of the shell exhibits induced crystallinity. The induced crystallinity of the polymer shell is recognizable and characterized in that the polymer of the shell exhibits both a glass transition temperature (Tg) and a melt temperature (Tm), for example as determined via differential scanning calorimetry (DSC) described below.

Methods of Molding Parts from Polymer-Ceramic Core-Shell Particle Powders

Figure 5:
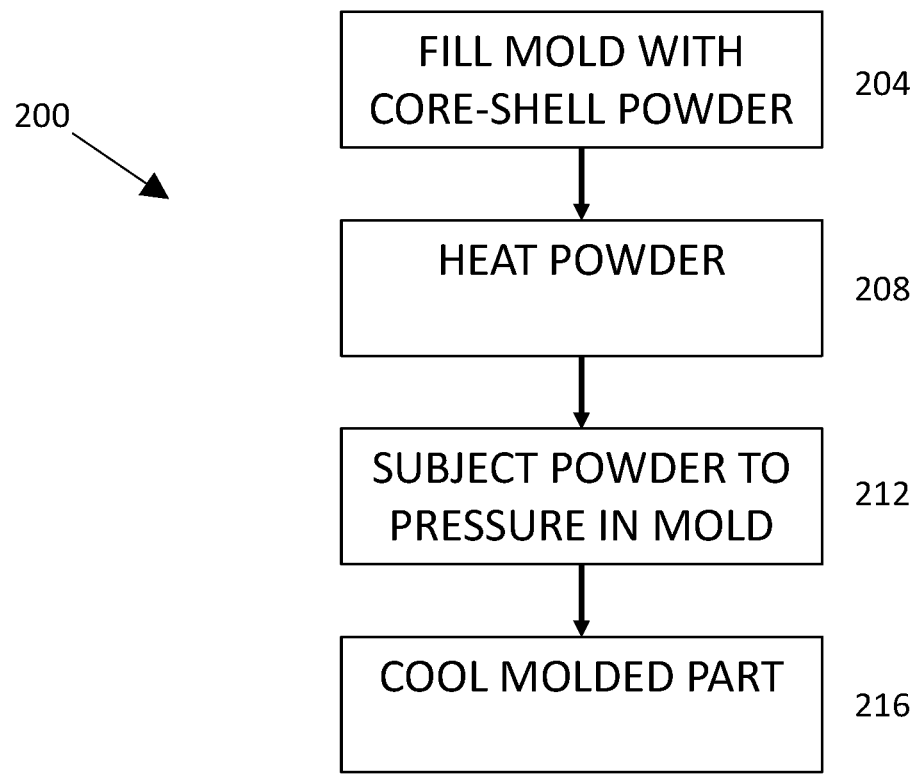
FIG. 5 is a flowchart of one example of a method of molding a part from a powder of the present core-shell particles.
Figure 6:
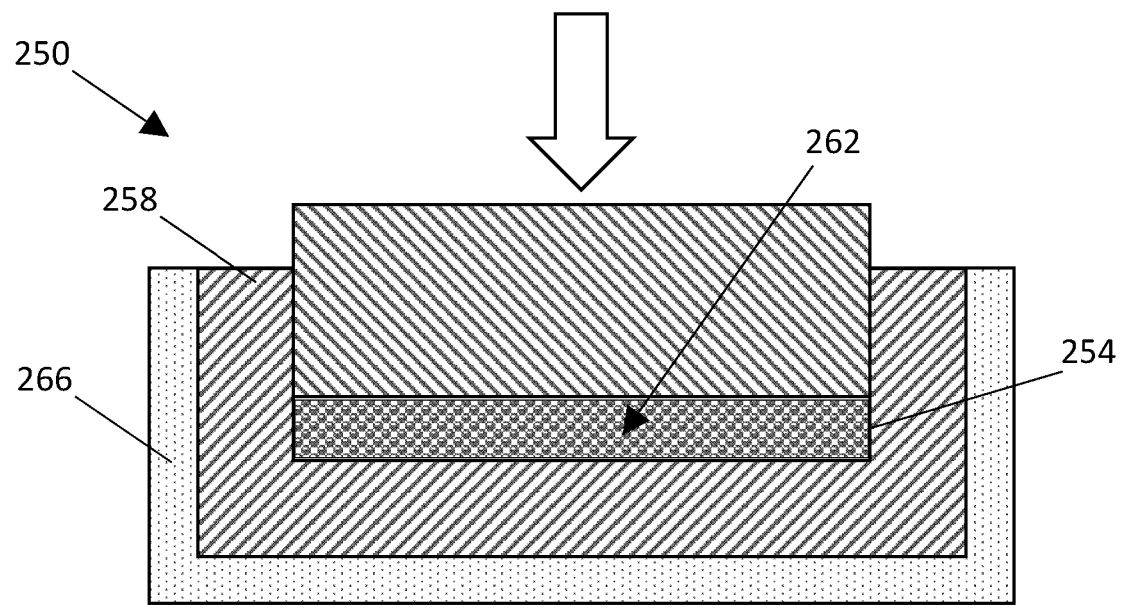
FIG. 6 is a schematic illustration of a compression mold for molding a part.

Referring now to FIGS. 5 and 6, FIG. 5 depicts a flowchart 200 of one example of a method of molding a part from a powder of the present core-shell particles, and FIG. 6 depicts a schematic illustration 250 of a compression mold for molding a part.

At a step 204, a working portion of a cavity 254 of a mold 258 is filled with a powder 262 of the present core-shell particles (e.g., 10).

At a step 208, the powder (262) is heated to at or above a first temperature (e.g., via a heating jacket 266) that exceeds (e.g., by at least 10° C., at least 20° C., at least 30° C., or more) a melting temperature ($T_m$) of the polymer. For example, when the $T_g$ of a particular PEI copolymer is ~225° C., the first temperature can be 250° C. By way of further example, when the $T_g$ of a particular PC copolymer is ~147° C., the first temperature can be 200° C.

At a step 212, which may be partially or entirely simultaneous with step 208, the powder is subjected to a first pressure (e.g., 350 Megapascals (MPa)) in the mold while the powder (e.g, and the mold) is held at or above the first temperature. The pressure may be maintained for a period of minutes (e.g., equal to or greater than 5 minutes, 10 minutes, 20 minutes, 30 minutes, 40 minutes, 50 minutes, 60 minutes, or more). In some implementations, the conditions (temperature, pressure, and/the like) and period of time for which the conditions are maintained are sufficient to result in a molded part with a relative density of greater than 90%.

EXAMPLES

1. Example 1: Powder of PEI Copolymer-ZnO Core-Shell Particles

Materials: 17.34 grams (g) Zinc Oxide (ZnO), 2.66 g PEI copolymer pellets (ULTEM CRS5001, SABIC Innovative Plastics IP B.V.), 180 g ODCB (split into 140 g and 40 g portions). Relative amounts of Zinc Oxide and PEI copolymer resulted in Zinc Oxide being about 60% by volume of the formed core-shell particles.

Procedure: The Zinc Oxide was homogenized in the 140 g portion of the ODCB in a 600 mL beaker using an IKA homogenizer (available from IKA Works, Inc. (Wilmington, NC USA)) for 5 minutes at 15,000 revolutions per minute (rpm). A small amount of the 40 g portion of the ODCB was then used to rinse the homogenizer head to remove residual Zinc Oxide from the homogenizer head. The Zinc Oxide and ODCB mixture, and the PEI copolymer, were then added to a 600 mL PARR™ reactor shell/container with agitator. Some of the remainder of the 40 g portion of the ODCB was used to rinse the beaker, with all of the ODCB then being added to the PARR™ reactor shell. The PARR™ reactor shell was then attached to the PARR™ reactor unit and the reactor controller was powered on. An line from a nitrogen ($N_2$) source was then attached to the head-space port of the PARR™ reactor shell, and the headspace in the shell purged several times with $N_2$. During the purging process, the pressure in the reactor shell was observed to ensure a tight seal. In particular, it was known that the $N_2$ in a sealed reactor shell would typically reach 80-95 psi. As such, once the $N_2$ was added to the headspace, the $N_2$ source was turned off and all of valves on the PARR™ reactor were closed. When the pressure remained substantially constant after about 45 seconds (s), the pressure was released and the headspace purged with $N_2$ two or three total times. If instead the pressure decreased, the pressure was released, the unit tightened again, and the process repeated until the pressure remained constant and the headspace could be thereafter purged the two or three total times. After the headspace was purged, the thermocouple was inserted into the temperature port on the reactor shell, and the cooling water line for the agitator was opened or turned on. The locking ring was then added around the point at which the shell attached to the rest of the PARR™ reactor unit and tightened as much as possible by hand. The heater was then aligned with and secured around the reactor shell.

Figure 7A:
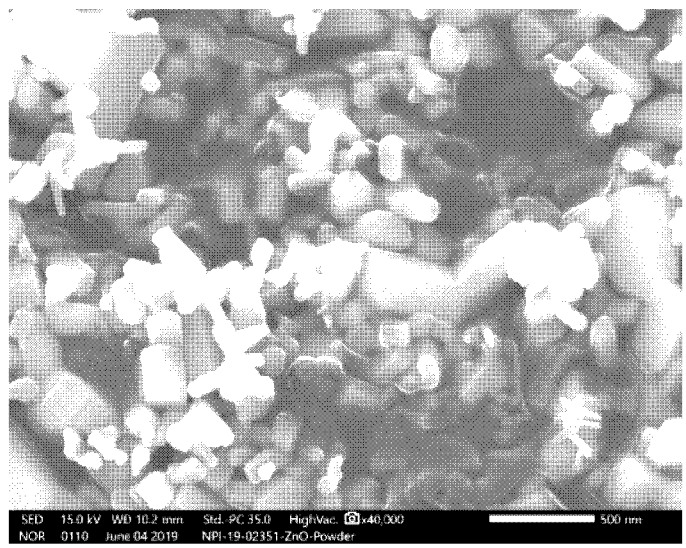
FIGS. 7A, 7B, and 7C are scanning electron microscope (SEM) images of uncoated ZnO particles, PEI copolymer-ZnO core-shell particles, and a compression-molded composite part made from a powder of the PEI copolymer-ZnO core-shell particles.
Figure 7B:
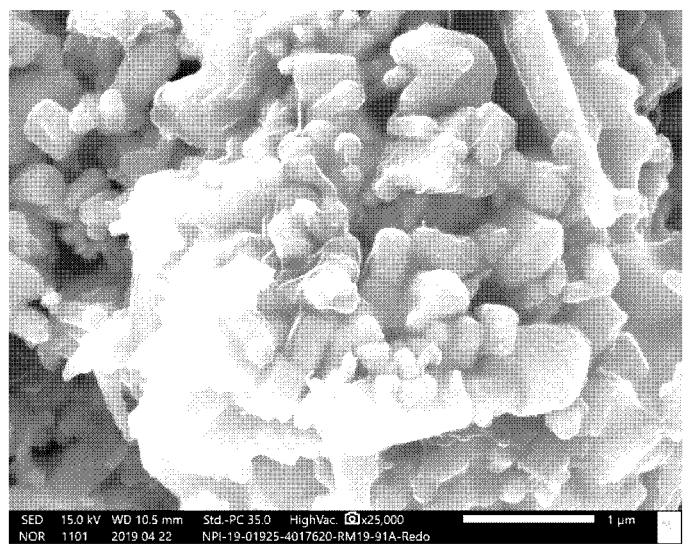

On the reactor controller, the primary temperature was then set to 250° C., the high limit pressure was set to 180 psi, the high limit temperature was set to 300° C. The heater was then set to Setting II (highest heat setting) and the agitator/impellor turned on and set to ~250 rpm. Once the temperature reached ~220° C., the heater was turned down to Setting I to allow for the maintenance of a more consistent temperature at 250° C. (to avoid the temperature fluctuating higher or lower than 250° C.). Once the thermocouple indicated the mixture in the reactor shell had reached 250° C., the reactor was held at that temperature for 30 minutes (min) while agitation continued. Reaction pressure at this temperature was about 75 psi or less, but in other implementations could be managed to be as high as 100 psi. After 30 minutes, the heater was turned off and the mixture allowed to cool to a temperature below 110° C. (time permitting, the mixture could be allowed to cool to 100° C.) to ensure that all PEI copolymer had precipitated. Once below 110° C., the pressure was typically at about 5 psi. The pressure release valve was then slowly turned to lower the pressure to ~0 psi. Once the pressure was relieved, the agitator was turned off, the reactor controller was turned off, and the cooling water line was turned off. The heater was then removed and the shell disengaged from the rest of the PARR™ reactor unit. The mixture in the reactor shell was then poured into a small beaker, and about an additional 100 milliliters (mL) of ODCB was used to rinse residual material from the interior of the reactor shell for transfer to the beaker. The material in the beaker was then poured into a Buchner funnel and filter flask setup with a Whatman GF/F glass microfibre filter paper. The filtered wet cake was then rinsed with about 250 mL of Methanol (MeOH), and placed into an aluminum pan and dried under vacuum at 200° C. overnight. FIG. 7A depicts Zinc Oxide particles, and FIG. 7B depicts the PEI copolymer-Zinc Oxide core-shell particles. Certain properties of the resulting dry powder of PEI copolymer-ZnO core-shell particles were then measured and are included in Tables 1 and 2 below.

2. Example 2: Powder of PEI Copolymer-Fe$_2$O$_3$ Core-Shell Particles

Materials: 16.12 grams (g) Ferric Oxide (Fe$_2$O$_3$), 2.66 g PEI copolymer pellets (CRS5001), 180 g ODCB (split into 140 g and 40 g portions). Relative amounts of Iron Oxide and PEI copolymer resulted in Iron Oxide being about 60% by volume of the formed core-shell particles.

Procedure: The procedure for this Example 2 was substantially the same as that described above for Example 1, with the exception that Ferric Oxide (Fe$_2$O$_3$) was used in place of Zinc Oxide (ZnO). Certain properties of the resulting dry powder of PEI copolymer-Fe$_2$O$_3$ core-shell particles were then measured and are included in Table 1 below.

3. Example 3: Powder of PEI Copolymer-SiO$_2$ Core-Shell Particles

Materials: 0.16 grams (g) Silica (SiO$_2$), 2.66 g PEI copolymer (CRS5001), 180 g ODCB (split into 140 g and 40 g portions). Relative amounts of Silica and PEI copolymer resulted in Silica being about 60% by volume of the formed core-shell particles.

Procedure: The procedure for this Example 3 was substantially the same as that described above for Example 1, with the exception that Silica (SiO$_2$) was used in place of Zinc Oxide (ZnO). Certain properties of the resulting dry powder of PEI copolymer-SiO$_2$ core-shell particles were then measured and are included in Table 1 below.

4. Example 4: Powder of PC Copolymer-ZrO$_2$ Core-Shell Particles

Materials: 19.04 grams (g) Zirconia (ZrO$_2$), 2.66 g polycarbonate (PC) copolymer (LEXAN EXL1463T, SABIC Innovative Plastics IP B.V.), 180 g Xylene (split into 140 g and 40 g portions). Relative amounts of Zirconia and PC copolymer resulted in Zirconia being about 60% by volume of the formed core-shell particles.

Procedure: The Zirconia was homogenized in the 140 g portion of the ODCB in a 600 mL beaker using an IKA homogenizer (available from IKA Works, Inc. (Wilmington, NC USA)) for 5 minutes at 15,000 revolutions per minute (rpm). A small amount of the 40 g portion of the Xylene was then used to rinse the homogenizer head to remove residual Zirconia from the homogenizer head. The Zirconia and Xylene mixture, and the PC copolymer, were then added to a 600 mL PARR™ reactor shell/container with agitator. Some of the remainder of the 40 g portion of the Xylene was used to rinse the beaker, with all of the Xylene then being added to the PARR™ reactor shell. The PARR™ reactor shell was then attached to the PARR™ reactor unit and the reactor controller was powered on. An line from a nitrogen (N$_2$) source was then attached to the head-space port of the PARR™ reactor shell, and the headspace in the shell purged several times with N$_2$. During the purging process, the pressure in the reactor shell was observed to ensure a tight seal. In particular, it was known that the N$_2$ in a sealed reactor shell would typically reach 80-95 psi. As such, once the N$_2$ was added to the headspace, the N$_2$ source was turned off and all of valves on the PARR™ reactor were closed. When the pressure remained substantially constant after about 45 seconds (s), the pressure was released and the headspace purged with N$_2$ two or three total times. If instead the pressure decreased, the pressure was released, the unit tightened again, and the process repeated until the pressure remained constant and the headspace could be thereafter purged the two or three total times. After the headspace was purged, the thermocouple was inserted into the temperature port on the reactor shell, and the cooling water line for the agitator was opened or turned on. The locking ring was then added around the point at which the shell attached to the rest of the PARR™ reactor unit and tightened as much as possible by hand. The heater was then aligned with and secured around the reactor shell.

On the reactor controller, the primary temperature was then set to 200° C., the high limit pressure was set to 180 psi, the high limit temperature was set to ~250° C. The heater was then set to Setting II (highest heat setting) and the agitator/impellor turned on and set to ~250 rpm. Once the temperature reached ~150° C., the heater was turned down to Setting I to allow for the maintenance of a more consistent temperature at 200° C. (to avoid the temperature fluctuating higher or lower than 200° C.). Once the thermocouple indicated the mixture in the reactor shell had reached 200° C., the reactor was held at that temperature for 30 minutes (min) while agitation continued. Reaction pressure at this temperature was about 75 psi or less, but in other implementations could be managed to be as high as 100 psi. After 30 minutes, the heater was turned off and the mixture allowed to cool to a temperature below 60° C. (time permitting, the mixture could be allowed to cool to 50° C.) to ensure that all PC copolymer had precipitated. Once below 60° C., the pressure was typically at about 5 psi. The pressure release valve was then slowly turned to lower the pressure to ~0 psi. Once the pressure was relieved, the agitator was turned off, the reactor controller was turned off, and the cooling water line was turned off. The heater was then removed and the shell disengaged from the rest of the PARR™ reactor unit. The mixture in the reactor shell was then poured into a small beaker, and about an additional 100 milliliters (mL) of Xylene was used to rinse residual material from the interior of the reactor shell for transfer to the beaker. The material in the beaker was then poured into a Buchner funnel and filter flask setup with a Whatman GF/F glass microfibre filter paper. The filtered wet cake was then rinsed with about 250 mL of Methanol (MeOH), and placed into an aluminum pan and dried under vacuum at 150° C. overnight. Certain properties of the resulting dry powder of PEI copolymer-ZnO core-shell particles were then measured and are included in Table 1 below.

5. Example 5: Compression Molded Pellet of PEI Copolymer-ZnO Core-Shell Particles Materials: 3 g of a dry powder of CRS5001-ZnO core-shell particles as produced in Example 1 described above.

Figure 7C:
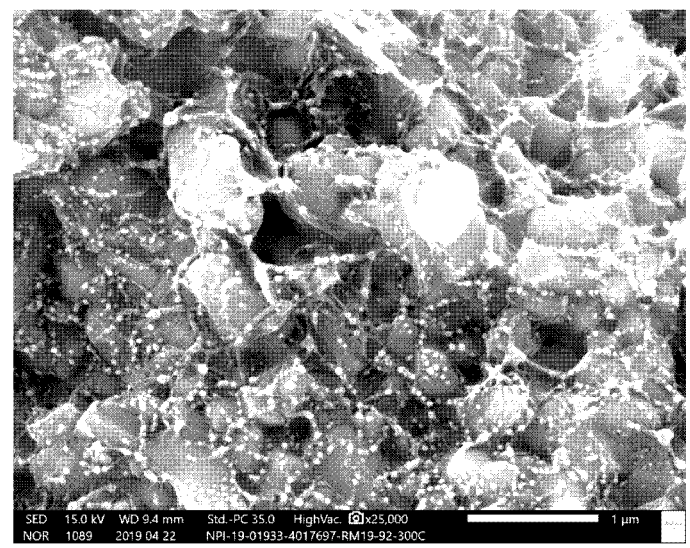

Procedure: 3 g of the powder was measured into an aluminum pan. Using a paper funnel, the powder was then poured into a circular cylindrical die of 13 millimeter (mm) internal diameter. The powder was then lightly compacted in the die using a rod, and a heating jacket was mounted around the die. The die was then heated to a first temperature of 260° C., and maintained at the first temperature for five (5) minutes. A hydraulic press was then used to apply to the powder a pressure of 5 tons or 370 MPa. The mold was then held at the first temperature, with the powder under pressure, for a period of thirty (30) minutes, after which the heater was turned off and the die allowed to cool while the pressure was maintained. After 30 minutes, the PEI copolymer-Zinc Oxide composite pellet was removed from the die, and the pellet weighed and its dimensions measured to calculate relative density. FIG. 7C depicts the microstructure of the compressed pellet, and certain characteristics of the pellets are included in Table 3 below.

6. Example 6: Powder of PPSU-A1203 Core-Shell Particles

Materials: 8.05 grams (g) Alumina ($Al_2O_3$), 1.95 g PPSU, 180 g ODCB (split into 140 g and 40 g portions). Relative amounts of Alumina and PPSU resulted in Alumina being about 60% by volume of the formed core-shell particles.

Figure 8A:
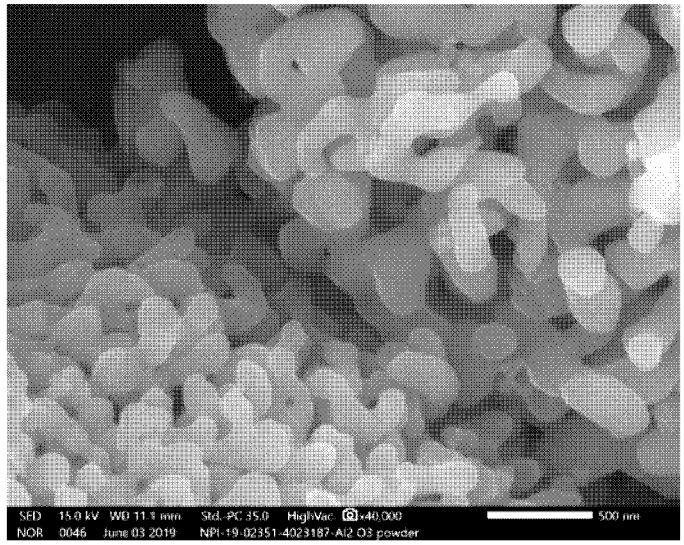
FIGS. 8A and 8B respectively are scanning electron microscope (SEM) images of uncoated $Al_2O_3$ particles, and of PPSU-$Al_2O_3$ core-shell particles.
Figure 8B:
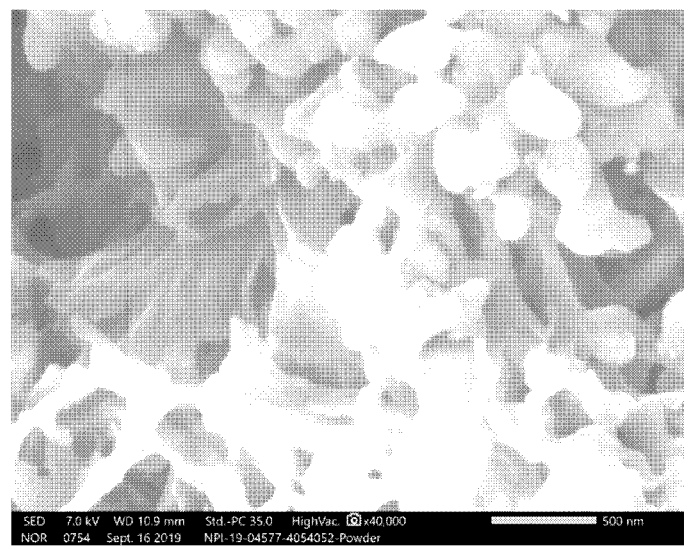

Procedure: The procedure for this Example 6 was substantially the same as that described above for Example 1, with the exception that PPSU was used in place of PEI copolymer, the agitator/impellor was set to 50 rpm instead of ~250 rpm, the reactor was held at temperature for 15 minutes instead of 30 minutes, the mixture was allowed to cool to 23° C. to ensure full precipitation instead of 100° C., and the core-shell particles were dried at 190° C. instead of 200° C. FIG. 8A depicts Alumina particles, and FIG. 8B depicts the PPSU-Alumina core-shell particles. Certain properties of the resulting dry powder of PPSU-A1203 core-shell particles were then measured and are included in Tables 1 and 2 below.

7. Example 7: Powder of PPSU-A1203 Core-Shell Particles

Materials: 8.05 grams (g) Alumina ($Al_2O_3$), 1.95 g PPSU, 180 g ODCB (split into 140 g and 40 g portions). Relative amounts of Alumina and PPSU resulted in Alumina being about 60% by volume of the formed core-shell particles. The PPSU was Radel® R5100 from Solvay, and the Alumina was MARTOXID® RN-405 from HUBER Engineered Materials.

Figure 9A:
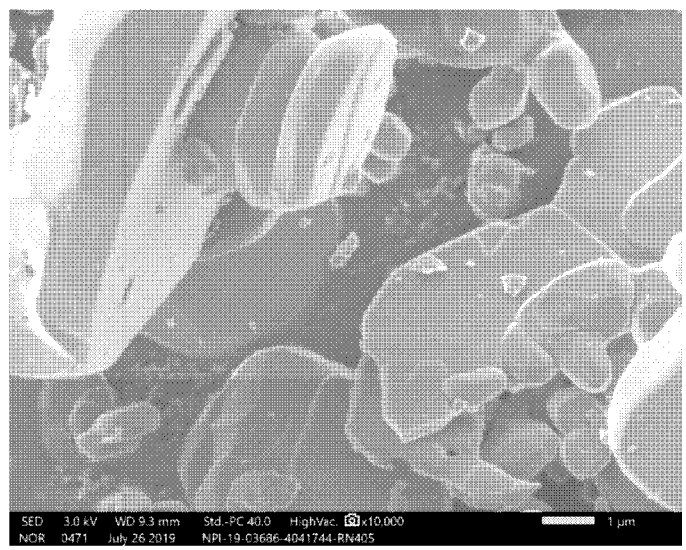
FIGS. 9A, 9B, and 9C respectively are scanning electron microscope (SEM) images of a second type of uncoated $Al_2O_3$ particles, of PPSU-$Al_2O_3$ core-shell particles, and a compression-molded composite part made from a powder of the PPSU-$Al_2O_3$ core-shell particles.
Figure 9B:
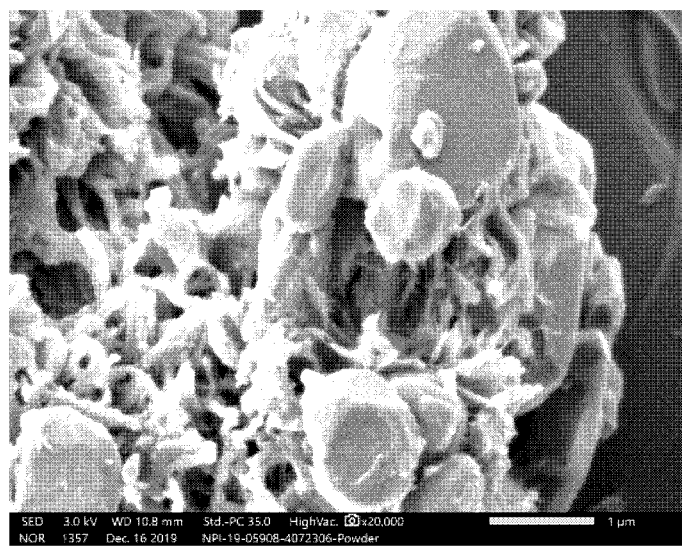

Procedure: The procedure for this Example 7 was substantially the same as that described above for Example 4, with the exception that PPSU was used in place of PEI copolymer, the primary temperature was set to 230° C. instead of 250° C., the mixture was allowed to cool to 23° C. to ensure full precipitation instead of 60° C., and the core-shell particles were dried at 190° C. instead of 200° C. FIG. 9A depicts the Alumina particles, and FIG. 9B depicts the PPSU-Alumina core-shell particles. Certain properties of the resulting dry powder of these PPSU-A1203 core-shell particles were then measured and are included in Tables 1 and 2 below.

8. Example 8: Compression Molded Pellet of PPSU-$Al_2O_3$ Core-Shell Particles Materials: 1.2 g of a dry powder of PPSU-$Al_2O_3$ core-shell particles as produced in Example 7 described above.

Figure 9C:
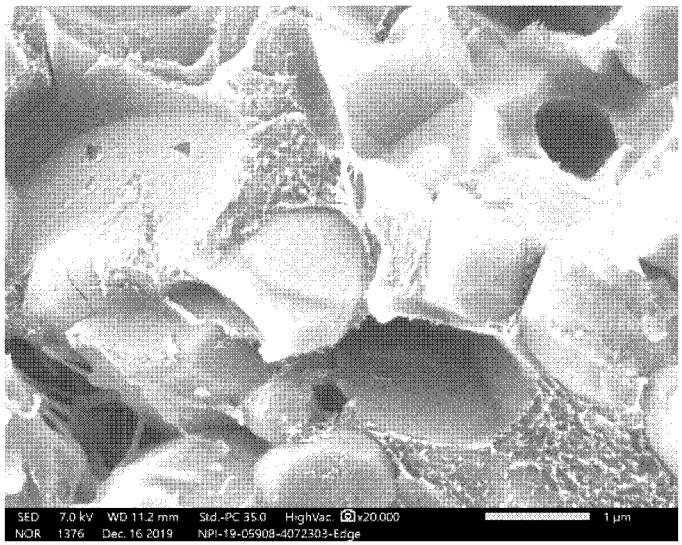

Procedure: The procedure for this Example 8 was substantially the same as that described above for Example 5, with the exceptions that PPSU-$Al_2O_3$ core-shell particles were used instead of PEI copolymer-ZnO core-shell particles, and the die was heated to a first temperature of 350° C. instead of 260° C. FIG. 9C depicts the microstructure of the compressed pellet, and certain characteristics of the pellets are included in Tables 3 and 4 below.

9. Example 9: Compression Molded Pellet of PPSU-$Al_2O_3$ Core-Shell Particles Materials: 6.572 g of a dry powder of PPSU-$Al_2O_3$ core-shell particles as produced in Example 7 described above.

Procedure: The procedure for this Example 9 was substantially the same as that described above for Example 8, with the exception that a 35 mm die was used instead of a 13 mm die. Certain properties of the resulting PPSU-Alumina pellet were then measured and are included in Table 4 below.

10. Experimental Results

As explained above for Examples 1-4 and 6-7, various combinations of powders with core-shell particles were produced, and certain processing parameters and properties of the powders are summarized in Table 1. As explained above for Examples 1-4 and 6-7, the superheat-cool powder-production process was carried out in a PARR™ reactor with reaction pressures less than or equal to 75 psi. With the exception of respective PEI copolymer (CRS5001) and PC copolymer (EXL1463T) reference powders, volume percent of ceramic or inorganic particles were kept constant at 60% for comparison purpose. The CRS5001 reference powder, designated in Table 1 as "Example 0-A" was made via a process similar to that described above for Example 1, with the exception that ceramic particles were not included in the mixture, CRS5001 particles were included at 10% by volume of the ODCB solvent, agitation proceeded at ~125 rpm instead of ~250 rpm, and it was not necessary to maintain the 250° C. temperature for 30 minutes to facilitate precipitation on ceramic particles. The EXL1463T reference powder, designated in Table 1 as "Example 0-B" was made via a process similar to that described above for Example 4, with the exception that ceramic particles were not included in the mixture, EXL1463T particles were included at 10% by volume of the Xylene solvent, agitation proceeded at ~125 rpm instead of ~250 rpm, and it was not necessary to maintain the 200° C. temperature for 30 minutes to facilitate precipitation on ceramic particles.

TABLE 1A

| | | | | | | | | | |
|---|---|---|---|---|---|---|---|---|---|
| Powder Production via Superheat-Cool Process - Process Parameters | | | | | | | | | |
| Example | Polymer | Filler | Solvent | PARR Agitation (rpm) | Max Temp. C. | Holding Time, min | Mass Polymer (g) | Mass Ceramic (g) | Polymer/ ceramic vol/vol |
| 0-A | CRS5001 | N/A | ODCB | 125 | 250 C. | N/A | 10% solids | N/A | N/A |
| 1 | CRS5001 | Zinc Oxide | ODCB | 250 | 250 C. | 30 | 2.66 | 17.34 | 40/60 |

TABLE 1A-continued

Powder Production via Superheat-Cool Process - Process Parameters

| Example | Polymer | Filler | Solvent | PARR Agitation (rpm) | Max Temp. C. | Holding Time, min | Mass Polymer (g) | Mass Ceramic (g) | Polymer/ ceramic vol/vol |
|---|---|---|---|---|---|---|---|---|---|
| 2 | CRS5001 | Silica | ODCB | 250 | 250 C. | 30 | 2.66 | 0.16 | 40/60 |
| 3 | CRS5001 | Iron Oxide | ODCB | 250 | 250 C. | 30 | 2.66 | 16.12 | 40/60 |
| 0-B | EXL1463T | N/A | Xylene | 125 | 200 C. | N/A | 10% solids | N/A | N/A |
| 4 | EXL1463T | Zirconia | Xylene | 250 | 200 C. | 30 | 2.66 | 19.04 | 40/60 |
| 0-C | PPSU | N/A | ODCB | 50 | 250 C. | 15 | 10% solids | N/A | N/A |
| 6 | PPSU | Alumina | ODCB | 50 | 250 C. | 15 | 1.95 | 8.05 | 40/60 |
| 7 | PPSU | Alumina | ODCB | 250 | 230 C. | 30 | 1.95 | 8.05 | 40/60 |

TABLE 1B

Powder Production via Superheat-Cool Process - Powder Parameters

| Example | Polymer | Filler | Dv10 (μm) | Dv50 (μm) | DV90 (μm) | Tg (° C.) | Tm (° C.) | Exotherm (J/g) |
|---|---|---|---|---|---|---|---|---|
| 0-A | CRS5001 | N/A | 2.75 | 15.3 | 56.4 | 228.7 | 297.9 | 31.6 |
| 1 | CRS5001 | Zinc Oxide | 0.026 | 0.13 | 4.18 | 230.80 | 291.1 | 3.9 |
| 2 | CRS5001 | Silica | 13.9 | 30.4 | 50.2 | 230.90 | 290.7 | 28.4 |
| 3 | CRS5001 | Iron Oxide | 2.71 | 9.42 | 26.2 | 230.09 | 286.3 | 5.0 |
| 0-B | EXL1463T | N/A | 42.9 | 75.2 | 124 | 148.55 | 224.8 | 29.1 |
| 4 | EXL1463T | Zirconia | 0.028 | 0.17 | 14.3 | 142.75 | 232.4 | 2.9 |
| 0-C | PPSU | N/A | | | | 225.2 | 263.2 | 23.3 |
| 6 | PPSU | Alumina | | | | 227.3 | 261.4 | 4.7 |
| 7 | PPSU | Alumina | 10.1 | 11.4 | 16.6 | 227.5 | 269.0 | 4.234 |

Particle size values of the powders were measured with a commercial particle size analyzer (available from Malvern Panalytical Ltd. in Malvern, UK).

Morphology of the particles was also investigated using scanning electron microscopy. For example, FIG. 7A shows uncoated Zinc Oxide particles; FIG. 7B shows PEI copolymer (CRS5001)-coated Zinc Oxide particles; and FIG. 7C shows PEI copolymer (CRS5001)-Zinc Oxide core-shell particles compression molded into a part. PEI copolymer coating on the ceramic particles is evident on the core-shell powder in FIG. 7B. A thin layer of PEI copolymer is also evident between the ceramic grains in FIG. 7C.

Thermogravimetric analysis (TGA) and molecular weight (measured via GPC) properties for the core-shell powder of Example 1, describe above, are summarized in Table 2. In addition, certain TGA and molecular weight properties were determined for the components of the respective core-shell powders, namely Zinc Oxide powder (Example 1A) and PEI copolymer (CRS5001) powder (Example 1B, respectively). The density and molecular weight of the respective powders is given as comparative reference. No apparent degradation in molecular weight of the polymer was observed as a result of the present superheating-cooling methods of making the present core-shell particles.

TABLE 2

Density, TGA, and Molecular Weight Data for Core-Shell Powders

| Example | Sample Type | Composition Filler | Composition Polymer | Density (g/cc) | TGA Polymer (wt %) | Molecular Weight Mw (Da) | Molecular Weight Mn (Da) | PD |
|---|---|---|---|---|---|---|---|---|
| 1A | Powder | ZnO | | 5.61 | N/A | N/A | N/A | N/A |
| 1B | Powder | | CRS5001 | 1.27 | N/A | 47806 | 18914 | 2.5 |
| 1 | Powder | ZnO | CRS5001 | 3.54 | 17.60 | 68001 | 24923 | 2.7 |
| 6A | Powder | Al$_2$O$_3$ | | 3.95 | 0.23 | N/A | N/A | N/A |
| 6B | Powder | | PPSU | 1.40 | 99.85 | 59245 | 22789 | 2.6 |
| 6 | Powder | Al$_2$O$_3$ | PPSU | 2.90 | 19.53 | 57688 | 29033 | 2.0 |
| 7 | Powder | Al$_2$O$_3$ | PPSU | 2.97 | 18.08 | 58382 | 29971 | 1.95 |

TGA and molecular weight (measured via GPC) results on compression molded parts made from the core-shell powders are summarized in Table 3. The density and molecular weight of the polymers parts molded at the same conditions as in Table 2 are given as comparative reference. No apparent degradation in molecular weight of the polymer was observed. However, there was an increase in molecular weight in compression molded PEI copolymer (CRS5001)-coated Zinc Oxide versus neat PEI copolymer that was compression molded at the same condition.

TABLE 3

Density, TGA and Molecular Weight of Pellets of Core-Shell Powders

| | Composition | | Temp/Time/Pres | Relative Density | TGA Density | Molecular Weight | | |
|---|---|---|---|---|---|---|---|---|
| Example | Filler | Polymer | (° C.)/min/ton | (g/cc) | (%) | Polymer (wt %) | Mw (Da) | Mn (Da) | PD |
| 5 | ZnO | CRS5001 | 300/30/5 | 3.5 | 102.7 | 15.49 | 66823 | 24126 | 2.77 |
| PPSU | | PPSU | 350/30/5 | 1.3 | | 99.9 | 59245 | 22789 | 2.6 |
| 8 | Al$_2$O$_3$ | PPSU | 350/30/5 | 2.95 | 99.5 | 18.13 | 46835 | 9697 | 4.83 |

Relative Density was determined by measuring the density of the molded pellet (Measured Density (ρM)) and comparing that to the Theoretical Density. The Measured Density may be calculated by dividing the volume, determined by measuring the outer dimensions (the volume of other shapes can be determined by any of various known methods, for example by submersion in an incompressible fluid), by the weighing the pellet (determined with a scale or balance). For the present examples, the Measured Density of the samples (e.g., pellets) was determined by the Archimedes method, using a KERN ABS-N/ABJ-NM balance equipped with an ACS-A03 density determination set. In particular, each sample was dried and the dry weight ($W_{dry}$) measured. The sample was then subjected to boiling in water for a period of 1 h to ensure that all voids in the object were filled with the water. The sample when then suspended in the used liquid at a known (non-boiling) temperature to determine the apparent mass in liquid ($W_{sus}$). The sample was then removed from the water, and the excess water wiped from the surface of the sample using a tissue moistened with the water. The saturated sample was then immediately weighed in air ($W_{sat}$). The density was then determined using Formula (IV):

$$\text{Density part} = \frac{Wdry}{Wsat - Wsus} * \text{density of water} \quad (1)$$

In the present examples, the quantities of polymer and ceramic in a pellet were known. When the starting proportions are not known, the organic content of the polymer in the compression-molded pellet can be determined by thermogravimetric analysis (TGA) in air, permitting the calculation of the content of ceramic in the compression-molded pellet. The combined density or Theoretical Density (ρT), assuming zero voids/gas content, was then calculated using Formula (IV):

$$\rho_T = ((m_p \times \rho_p) + (m_c \times \rho_c))/(m_p + m_c) \quad (2)$$

where $m_p$ is the mass of the polymer in the molded pellet, $\rho_p$ is the density of the polymer, $m_c$ is the mass of the ceramic in the molded pellet, and $\rho_c$ is the density of the ceramic. Relative Density (ρR) is then calculated according to Formula (V):

$$\rho_R = \rho_M/\rho_T \times 100 \quad (3)$$

The molecular weight measurements reported in Table 2 and Table 3 above, and in Table 4 below, were measured via liquid chromatography using an Agilent 1260 Infinity II HPLC (available from Agilent Technologies, Inc. (Santa Clara, CA, USA)) that comprised an Isocratic Pump, Vial-sampler, multi-column thermostat (MCT) to regulate the mobile phase temperature passing through the columns, and a variable wavelength detector (VWD). The system was controlled by Agilent GPC/SEC software, and the measurements performed using known methods.

The measurement of weight changes, programmed as isothermal or linear heating temperature conditions, can be monitored in solid or liquid specimen by the use of a Thermogravimetric Analyzer (TGA). The measurement of weight change, normally weight loss, can result from the degradation (thermal or oxidative) of the specimen, of by the evolution of volatiles below the degradation temperature of the sample. For the TGA measurements discussed herein, less than 50 mg of sample was weighed in a platinum pan, and the TGA test was conducted using a Discovery TGA at hearing rate of 20° C. per minute in air.

Thermal analysis was performed by differential scanning calorimetry (DSC), a method of measuring heat flow as a function of temperature, as well as thermal transitions of samples (e.g., polymers, monomers, and additives) according to a predetermined time and temperature program. These thermal transitions are measured during heating, cooling, or isothermal cycles; and these transitions occur when the material undergoes a physical or chemical change. DSC was carried out on a TA-Q1000 Analyzer at 20 C/min.

Rectangular beams were also cut using a CNC mill from the 35 mm pellet produced above for Example 9, and certain mechanical properties determined. In particular, beams were cut to have a rectangular cross section of 4 mm×3 mm, and were polished using a 600 grit sand paper and tested under 3-point bending at a 1 mm per minute (mm/min) displacement rate. Table 4 summarizes the measured properties along with reference properties of Al$_2$O$_3$ alone obtained in literature.

TABLE 4

Mechanical Properties of Compression Molded Parts

| | Molecular Weight | | | Mechanical Properties | | |
|---|---|---|---|---|---|---|
| Example | Mw (Da) | Mw (Da) | Mw (Da) | Flexural Modulus (GPa) | Flexural Strength (MPa) | Flexural Strain (%) |
| 9 | 46835 | 9697 | 4.83 | 24.4 | 112.9 | 0.76 |
| Al$_2$O$_3$ | — | — | — | 350-400 | ~350 | |

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this disclosure. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiments. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. Accordingly, no single implementation described herein should be construed as limiting and implementations of the disclosure may be suitably combined without departing from the teachings of the disclosure.

The claims are not intended to include, and should not be interpreted to include, means plus- or step-plus-function limitations, unless such a limitation is explicitly recited in a given claim using the phrase(s) "means for" or "step for," respectively.

The invention claimed is:

1. A ceramic-polymer composite powder, the powder comprising:
   a plurality of core-shell particles, where:
      each of the core-shell particles comprises a core and a shell around the core;
      the core comprises a particle of a ceramic selected from the group of ceramics consisting of: $Al_2O_3$, $Fe_3O_4$, $Fe_2O_3$, ZnO, $ZrO_2$, $SiO_2$, and combinations of any two or more of these ceramics;
      the shell comprises a polymer selected from the group of polymers consisting of: polycarbonate (PC) copolymers, polyetherimide (PEI), polyetherimide (PEI) copolymers, polyphenylsulfone (PPSU), polyarylethersulfone (PAES), and polyether sulfones (PES); and
   where the core-shell particles comprise between 50% and 90% by volume of the ceramic, and between 10% and 50% by volume of the polymer;
   where the core-shell particles have a Dv50 of from 100 nanometers (nm) to 100 micrometers (µm); and
   where substantially all of the polymer is not cross-linked; and
   where the core-shell particles are in powder form.

2. The powder of claim 1, where the core-shell particles comprise between 50% and 70% by volume of the ceramic.

3. The powder of claim 1, where the polymer of the shell exhibits induced crystallinity.

4. The powder of claim 1, where the core-shell particles have a polymer-solvent content of less than 3000 parts per million (ppm).

* * * * *